Figure 1:
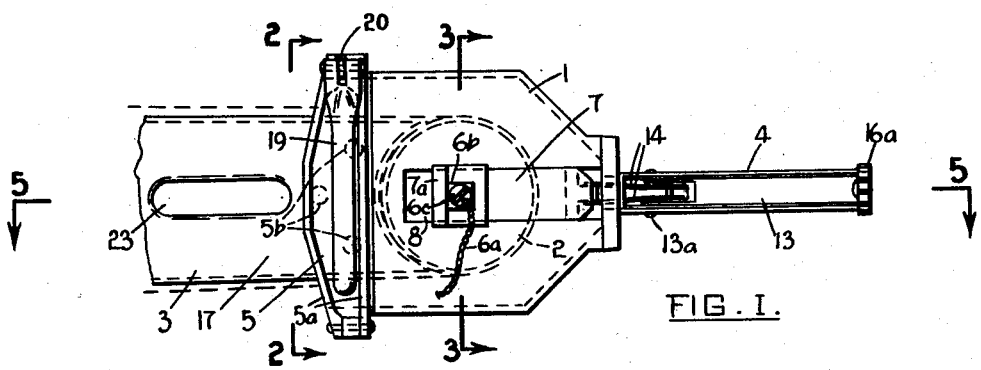

June 16, 1953  A. T. QUIRKE  2,642,100
REMOVABLE HANDLE ASSEMBLY FOR POWER CHAIN SAWS
Filed March 15, 1948  2 Sheets-Sheet 1

INVENTOR
ALAN T. QUIRKE
BY Young, Emery & Thompson ATTYS.

June 16, 1953     A. T. QUIRKE     2,642,100
REMOVABLE HANDLE ASSEMBLY FOR POWER CHAIN SAWS
Filed March 15, 1948     2 Sheets-Sheet 2

INVENTOR
ALAN T. QUIRKE
By Young, Emery & Thompson
Att'ys.

Patented June 16, 1953

2,642,100

UNITED STATES PATENT OFFICE 2,642,100

REMOVABLE HANDLE ASSEMBLY FOR POWER CHAIN SAWS

Alan Thomas Quirke, Otunui, New Zealand

Application March 15, 1948, Serial No. 14,899
In New Zealand February 12, 1948

9 Claims. (Cl. 143—32)

This invention relates to power chain saws of the type wherein a chain driven around a stationary guiding bar or blade has attached to it the requisite cutting teeth, and the guiding bar or blade has attached to its outer end a handle assembly embodying a handle grip by which the saw can be fed through the timber and lifted when required.

A well-known disadvantage of known forms of power chain saws of this type is that to remove a saw from the cut it is often necessary to partially remove the saw, drive wedges ahead of the saw, and remove those behind the saw. This is an extremely difficult operation when handling heavy timber, requiring a great expenditure of energy and time in driving and removing wedges and is sometimes ineffective. In the event of anything going wrong, the saw may be very badly damaged which is much more serious than in the case of an ordinary cross-cut saw owing to the intricate nature of the apparatus and its high cost.

The main object of this invention is to enable a saw of the above type to be quickly and easily withdrawn from the cut when required, without necessitating the manipulation of wedges as above described.

In one aspect the invention consists in a power chain saw of the type described, wherein the construction is such that the handle assembly can be removed, leaving the idler pulley at the outer end of, and supported by the guiding bar or blade so that the saw can be readily removed longitudinally through the cut.

In another aspect, the invention consists in a power chain saw of the type described, wherein the construction is such that the handle assembly can be removed, leaving the idler pulley at the outer end of, and supported by the guiding bar or blade, the overall thickness of the end of the guiding bar or blade and the idler pulley and adjacent parts left when the handle assembly is removed being insufficient to prevent withdrawal of the saw longitudinally through the cut.

In a further aspect, the invention consists in a power chain saw of the type described, wherein the idler pulley is normally held and tensioned from the handle assembly provision being made whereby said pulley can be readily released from the handle assembly so as to be disposed at the outer end of, and supported by the guiding bar or blade, provision being also made for quickly detaching the handle assembly from the guiding bar or blade, and the overall thickness of the end of the guiding bar or blade and the idler pulley and adjacent parts left when the handle assembly is removed being insufficient to prevent withdrawal of the saw longitudinally through the cut.

Figure 2:
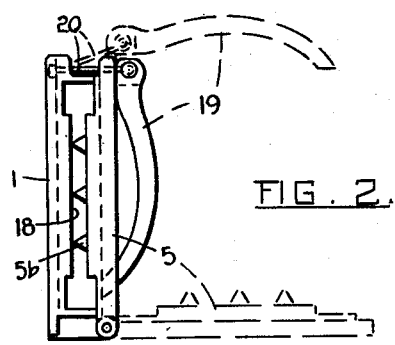
Figure 3:
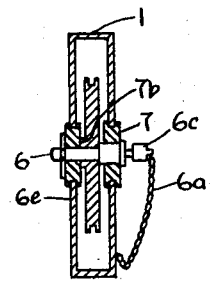
Figure 4:
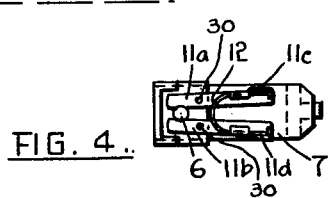
Figure 5:
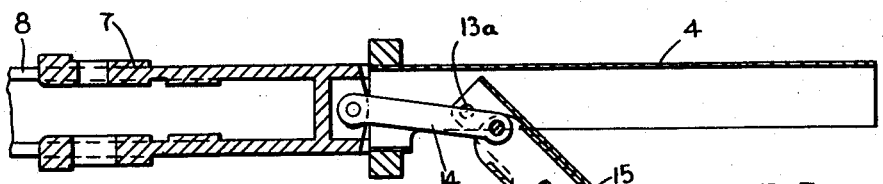
Figure 6:
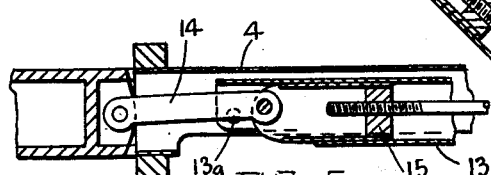
Figure 7:
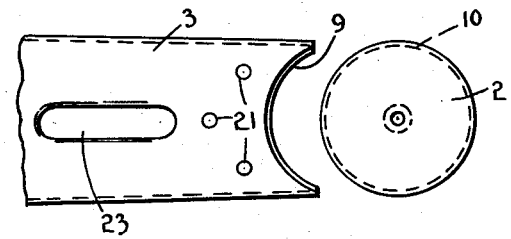
Figure 8:
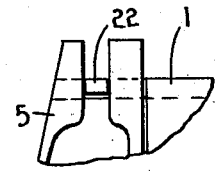
Figure 10:
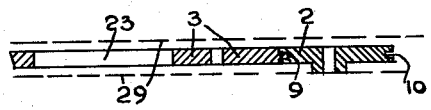
Figure 9:
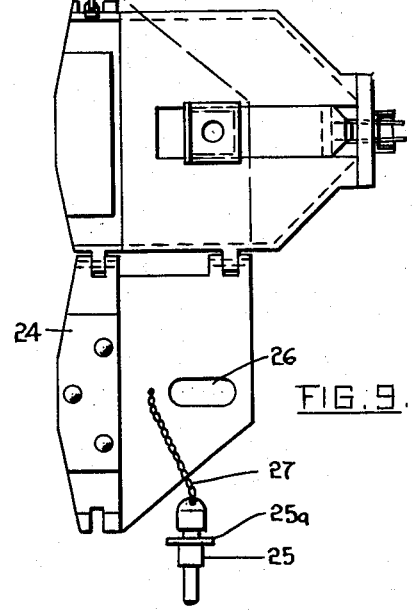

In the accompanying drawings:

Figure 1 is a side elevation of one form of the invention,

Figure 2 is an end elevation thereof, in the direction indicated by the arrows 2—2, Figure 1, the guiding bar or blade being omitted and the clamping plate and cam lever being shown closed in full lines and open in broken outline, Figure 3 is a cross section on the line 3—3, Figure 1, Figure 4 is a side elevation of the far side of the supporting means or yoke from which the idler pulley is carried, showing one form of releasable locking means for retaining the axle in place, Figure 5 is an enlarged section on the line 5—5, Figure 1, through a part of the handle assembly, the lever for slackening the chain and thus facilitating removal of the axle being shown swung part-way open, Figure 6 is a part section on the line 5—5, Figure 1, showing the lever closed, Figure 7 is a side elevation of the outer end of the guiding bar or blade and the idler pulley, showing them slightly separated in order to illustrate how the said pulley is supported by the said guiding bar or blade when the handle assembly is removed, Figure 8 is a fragmentary side elevation of a part of the clamping plate and the main housing of the handle assembly, showing means for locating the outer end of the clamping plate relatively to the said housing, Figure 9 is a side elevation of an alternative form of the invention, with the clamping plate and cam lever open, and Figure 10 is a diagrammatic axial section through the guide bar and idler pulley, showing how the necessary clearance is provided for withdrawing the parts through a cut made by the saw.

In the construction shown in Figures 1 to 8 of the drawings, the handle assembly comprises a main housing 1 adapted to enclose the idler pulley or wheel 2 and a part of the guiding bar or blade 3, a handle grip 4 projecting from the housing in the usual position, clamping means 5 for securing the handle assembly to the guiding bar or blade and an axle 6 on which the idler pulley normally runs, said axle being carried by supporting means in the form of a yoke 7 supported by and slidably carried in guide slots 8 in the housing 1 and adjustable by means to be hereinafter described to adjust the tension in the saw chain by adjusting the position of the idler pulley 2. The pulley is consequently normally held and tensioned from the handle assembly.

Provision is made whereby the idler pulley 2 can be readily released from the handle assembly so that the handle assembly can be detached from the guiding bar or blade 3 leaving the pulley supported by and at the outer end of, the said bar or blade, and so that the saw can be readily removed longitudinally from the cut. To this end, the yoke 7 is releasable in a manner to be hereinafter described in order to slacken the chain without "losing" the tension adjustment, after which the axle 6 is removable from the yoke, thus releasing the pulley from the handle assembly which can then be removed.

Releasable locking means are provided to normally lock the axle 6 to the yoke and the axle is also provided with connecting means consisting of a chain 6a by which the said axle is permanently connected to the handle member even when removed from the yoke. The axle 6 is provided with a square enlargement 6b adapted to coact with a rib 7a on the yoke, which prevents turning of the axle, and a grease cup 6c is provided on the axle, for the purpose of lubricating the journal of the axle in known manner, the chain 6a being attached to the said grease cup. The axle also has a shoulder 6e adapted to coact with an inwardly disposed face 7b of the yoke 7 to locate the pulley 2 within the handle assembly.

The guiding bar or blade 3 is provided with a curved rib 9 adapted to engage in the chain groove 10 in the idler pulley 2 and thus support the said pulley when the axle and handle assembly is removed.

The overall thickness of the end of the guiding bar or blade 3 and the pulley 2 and saw-toothed chain left when the handle assembly is removed is insufficient to prevent longitudinal withdrawal of the saw from the cut. This will be apparent from Figure 10, which shows the width of the guide bar or blade 3 and idler pulley in relation to the width of cut made by the saw. The width of cut, indicated by the broken lines 29, is the result of the arrangement and set of the cutting teeth on the saw-toothed chain.

The releasable locking means to normally lock the axle 6 to the yoke comprise releasable spring-loaded catch means pivotally and accessibly mounted to one side of the handle assembly—i. e. to the side of the yoke and a groove or slot in the projecting end portion of the axle 6 and adapted to be engaged by the said catch means to normally prevent axial withdrawal of the axle. The catch means comprise two oppositely disposed catches 11a and 11b, each pivoted at 30 and disposed at opposite sides of the axle 6, and having outwardly projecting flanges or grips 11c and 11d provided thereon by which they can be operated to release the axle. The two catches 11a and 11b are spring-loaded by means of a U-shaped spring 12 which tends to hold their outer ends apart and thus hold the catches in an annular groove or slot 6d.

The yoke 7 is movable within the housing 1 for the purpose of adjusting the operating tension of the chain, and also to slacken the chain without "losing" the tension adjustment, and thus facilitate removal of the axle preparatory to removing the handle, the requisite yoke movement being effected in the latter case by chain slackening means carried by the handle grip and constructed as follows:

A lever 13 housed within the handgrip 4 during sawing operations is connected to the yoke member 7 per medium of an appropriate linkage 14 and is pivotally associated with the handle grip 4 so that it can be swung outwards as shown in Figure 5, the pivot 13a about which the lever is pivotal being so disposed in relation to the linkage that sufficient outward pivoting of the said lever causes the linkage to slacken the chain and thus facilitate removal of the axle 6. Furthermore, the pivotal axis 13a of the lever is so disposed, as will be apparent on reference to Figures 5 and 6, that as the lever 13 is swung in either direction it passes through a dead centre position, this being so arranged that the chain tension normally keeps the lever in the desired position relatively to the hand grip, with the chain tension applied.

The lever 13 incorporates the adjusting means by which the chain tension can be adjusted, the construction being as follows:

The lever 13 has a longitudinal passage 13b therethrough, a slidable nut member 15 being located in said passage and being pivotally coupled to the linkage 14, constituting in effect intermediate means by which the movement of the lever is transmitted to the said linkage. A bolt member 16 has a manually operable knurled head 16a projecting from and bearing against the outer end of the lever 13 and adapted when the lever is in its normal position applying tension to the chain to be disposed at the outer end of the handle grip 4. The clamping means 5 consist of quickly releasable clamping plate pivoted to one side of the housing 1 and extending sufficiently far inwards into the interior of the handle assembly to clamp against the side 17 of the guiding bar or blade 3, within the chain, and thus clamp the handle assembly securely in place against a coacting inwardly projecting part or face 18 within the housing and at the opposite side thereof. Said plate can be swung outwards when desired to release the handle assembly from the guiding bar or blade.

A cam lever 19 is pivotally carried by a link 20 from the handle housing and is actuable to hold the clamping plate in position or release it as desired. In the latter case the link permits the cam lever to be swung out of the way to allow the clamping plate to be swung open. When in use holding the clamping plate closed, the outer end of the cam lever 19 may be shielded against inadvertent release by means of projecting ribs 5a projecting from the clamping plate.

The clamping plate carries three inwardly directed con-shaped locating projections 5b adapted to engage a corresponding number of recesses or holes 21 in the guiding bar or blade, to guard against or minimise inadvertent relative movement between the handle assembly and the guiding bar or blade 3. To further guard against such relative movement, a projection 22 is provided on the housing, as shown in Figure 8, and is adapted to engage in the fork at the outer or free end of the clamping plate.

The guiding bar or blade 3 is provided with a hand hole 23 by which it can be lifted and handled when the handle assembly is removed.

In operation, the pulley 2 is normally carried by the axle 6 from the yoke 7, tension adjustments can be effected by operation of the head 16a of the bolt 16, and the handle assembly is held securely on the guiding bar or blade 3 by the clamping plate 5 and cam lever 19. When it is desired to remove the saw longitudinally through the cut, the lever 13 is swung outwards to slacken the chain, the catches 11a and 11b are released and the axle 6 withdrawn, after which the cam lever 19 and clamping plate 5 are opened and the handle assembly is removed, the pulley 2 being left supported by and at the outer end of the guiding bar or blade 3. When it is desired to assemble the handle assembly again, the order of operations is reversed.

The above procedure requires the expenditure of only a minimum of time which is an advantage in an emergency and the handle assembly is held securely in place during use.

In the alternative construction shown in Figure 9, the clamping plate 24 is of such width as to hold or assist in holding the axle 25 in place, said axle having an enlarged squared portion 25a adapted to be overlaid by the clamping plate for this purpose. In this construction, access to the grease cup is obtained through an elliptical aperture 26 in the clamping plate, which at the same time does not interfere with adjustment or slackening of the chain tension.

In this form of the invention, the axle 25 is removable when the clamping plate 24 is swung open, said axle being connected by a chain 27 to the inside of the clamping plate 24 so that removal of the handle assembly is only a matter of two simple operations, first the release of the cam lever 28, and secondly the swinging open of the clamping plate 24, which in this case withdraws the axle. The handle assembly can now be removed. This feature is particularly valuable in an emergency.

I claim:

1. A power chain saw comprising a guide bar, a saw-toothed chain movable around said guide bar, driving means for driving the said saw-toothed chain and including a driving sprocket, an idler wheel about which the chain travels at the end of the bar remote from the driving means, a handle assembly by which feeding of the saw can be controlled, quickly detachable securing means by which the handle assembly is attachable to and quickly detachable from the guide bar, means for rotatably carrying the idler wheel from the handler assembly, said means being operable to release the said idler wheel from the handle assembly when the handle assembly is to be removed, and locating means on the guide bar adapted to support the idler wheel from the said guide bar when the handle assembly is removed, so that the saw can then normally be readily removed longitudinally through the cut made thereby.

2. A power chain saw as claimed in claim 1 wherein an axle is provided for the idler wheel and wherein a chain slackening means is provided to slacken the chain and facilitate removal of the axle, the means for carrying the idler wheel being movable within the handle assembly by the chain slackening means carried by the handle grip, said chain slackening means comprising a lever connected to the supporting means by means of a linkage and pivotally associated with the handle grip so that it can be swung outwards, the pivot about which the lever is pivotal being so disposed in relation to the linkage that sufficient outward pivoting of the said lever causes the linkage to slacken the chain and thus facilitate removal of the axle.

3. A handle assembly for the guide bar and idler wheel of a power chain saw, comprising a housing having quickly releasable means to detachably secure it to the guide bar, and means on the housing and connected to the wheel for normally detachably securing the wheel to the handle assembly and being readily releasable from the handle assembly, so that the wheel when released from the handle assembly it is temporarily disposed at the outer end of, and supported by, the guide bar, the overall thickness of the end of the guide bar and the idler wheel and saw-toothed chain remaining when the handle assembly is removed being insufficient to prevent withdrawal of the saw longitudinally through the cut.

4. A handle assembly for a power chain saw as claimed in claim 3, in which the said last-mentioned means comprises releasable spring-loaded catch means pivotally and accessibly mounted to one side of the handle assembly and in which a removable axle is provided in the handle and having a groove or slot in the projecting end portion of the axle and adapted to be engaged by the said catch means to normally prevent axial withdrawal of the axle.

5. A handle assembly for a power chain saw as claimed in claim 3, wherein a handle grip and lever are provided in which the handle grip is adapted to house the lever during sawing operations, said lever being pivoted to the handle grip to be foldable within the handle grip to form a single hand hold.

6. A handle assembly for the guide bar and idler wheel of a power chain saw, comprising a housing having quickly releasable means to detachably secure it to the guide bar, and means on the housing and connected to the wheel for normally detachably securing the wheel to the handle assembly and comprising a wheel carrier guided and supported from the handle assembly and adjusting means to actuate the wheel carrier and idler wheel to adjust the chain tension and chain slackening means to actuate the wheel carrier to slacken the chain without "losing" the tension adjustment when it is desired to remove the handle assembly, the said chain slackening means being readily releasable from the handle assembly so that the wheel when released is temporarily disposed at the outer end of, and supported by, the guide bar, the overall thickness of the end of the guide bar and the idler wheel and saw-toothed chain remaining when the handle assembly is removed being insufficient to prevent withdrawal of the saw longitudinally through the cut.

7. A handle assembly for the guide bar and idler wheel of a power chain saw, comprising a housing having quickly releasable means to detachably secure it to the guide bar, means on the housing and connected to the wheel for normally detachably securing the wheel to the handle assembly and being readily releasable from the handle assembly, so that the wheel when released is temporarily disposed at the outer end of, and supported by, the guide bar, the overall thickness of the end of the guide bar and the idler wheel and saw-toothed chain remaining when the handle assembly is removed being insufficient to prevent withdrawal of the saw longitudinally through the cut, the quickly releasable means to detachably secure the housing to the guide bar consisting of a clamping plate pivoted to one side of the handle assembly and adapted to be swung outwards to release the handle assembly from the guide bar, said clamping plate when swung inwards to its clamping position engaging said bar to clamp the guide bar against a coacting part of the handle assembly at the opposite side thereof, and a cam lever pivotally carried on the handle assembly to hold the clamping plate in clamping position or release it as desired.

8. A handle assembly for the guide bar and idler wheel of a power chain saw comprising a main housing and clamping means secured on the end of the guide bar by means of which the handle assembly is attachable to and quickly releasable from the guide bar, means in the main housing for rotatably supporting the idler wheel and for releasing the handle assembly from the idler wheel when the handle assembly is removed from the guide bar, and releasable locking means operatively connected to the second-mentioned means to adjust the idler wheel to tighten the saw chain, said second-mentioned means for rotatably supporting the idler wheel including a removable axle for the wheel and a spring-loaded catch means comprising two oppositely disposed pivoted catches at opposite sides of the axle to grip the latter and hold the axle in the second-mentioned means.

9. A handle assembly for the guide bar and idler wheel of a power chain saw comprising a main housing and clamping means secured on the end of the guide bar by means of which the handle assembly is attachable to and quickly releasable from the guide bar, means including a removable pin in the assembly for rotatably supporting the idler wheel and for releasing the handle assembly from the idler wheel when the handle assembly is removed from the guide bar, and releasable locking means operatively connected to the second-mentioned means to adjust the idler wheel to tighten the saw chain, said releasable locking means comprising a yoke in which the idler wheel is rotatably mounted and slidable in the housing, a handle grip secured to the housing and having a hollow portion, a lever pivoted to the handle grip and rotatable into and out of the hollow portion, and a toggle link pivotally secured at one end to the yoke and the other end to the lever so that the chain may be tightened by folding the lever within the hollow portion or to release the tension in the chain by breaking the toggle.

ALAN THOMAS QUIRKE.

References Cited in the file of this patent

UNITED STATES PATENTS

| Number | Name | Date |
|---|---|---|
| 1,016,664 | Bailey | Feb. 6, 1912 |
| 1,786,641 | Berg | Dec. 30, 1930 |
| 2,326,854 | Hassler | Aug. 17, 1943 |
| 2,432,567 | Forrest | Dec. 16, 1947 |
| 2,444,132 | Gorden et al. | June 29, 1948 |

FOREIGN PATENTS

| Number | Country | Date |
|---|---|---|
| 115,178 | Australia | May 18, 1942 |
| 274,348 | Great Britain | July 21, 1927 |